Patented Sept. 27, 1932

1,879,424

UNITED STATES PATENT OFFICE

WILHELM NEELMEIER AND EUGEN GLIETENBERG, OF LEVERKUSEN, NEAR COLOGNE, GERMANY, ASSIGNORS TO GENERAL ANILINE WORKS INC., OF NEW YORK, N. Y., A CORPORATION OF DELAWARE

WATERSOLUBLE DIAZO COMPOUND

No Drawing. Application filed March 28, 1929, Serial No. 350,801, and in Germany April 14, 1928.

The present invention relates to a process of preparing water-soluble condensation products from diazotized aromatic amines and secondary amines and to new products obtainable thereby, more particularly it relates to compounds of the probable general formula

wherein R stands for an aromatic nucleus which may be substituted, for example by halogen, nitro—, alkyl— sulfuric acid—, or carboxylic acid-groups, $R_1$ stands for hydrogen, alkyl, a hydrogenated benzene nucleus, or for the residue of an aldehyde-sulfurous acid, said residue of an aldehyde-sulfurous acid may be represented by the formula

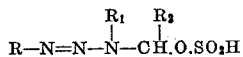

wherein R′ means hydrogen, alkyl— or a phenyl group, and $R_2$ stands for hydrogen, or an alkyl—, or a phenyl group.

Our new compounds are obtainable by introducing a diazo-solution which is prepared in the usual manner by diazotization of an aromatic amine with hydrochloric acid and sodium nitrite, into an aqueous solution of an alkali metal salt of a compound of the general formula

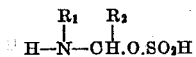

wherein $R_1$ and $R_2$ mean the same as the above mentioned $R_1$ and $R_2$, in the presence of an acid binding agent, for instance, caustic alkalies, alkali-metal carbonates, sodium acetate, pyridine. The process is favorably carried out at temperatures not higher than about 20° C.; the quantities of the two components which are caused to react upon each other may be varied within the widest limits, but generally we take care that molecular quantities are present, the best results being obtained if an excess of the coupling component is present.

The starting compounds of the general formula

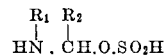

are obtainable by causing ammonia, primary aliphatic or hydroaromatic amines to react upon the bisulfite compounds of aldehydes. One of the coupling compounds falling within the scope of the general formula is described in German Patent 216,072.

Our new compounds in some cases partially separate during the reaction and the separation is completed by the addition of salts for example sodium or potassium chloride. They are obtained in a crystalline form and are in the dry state very stable, generally yellowish colored substances which are generally soluble in water and which by the addition of a mineral acid or an acid salt of a mineral acid such as sodium bisulfate or strong organic acids to their aqueous solution are split up into the two components, that means into the diazo compound and a compound of the general formula

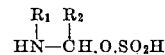

wherein $R_1$ and $R_2$ mean the same as above described. The new products are valuable products in the manufacture of azo dyestuffs.

The invention is illustrated by the following examples but is not restricted thereto.

Example 1

Into an aqueous solution of 1¼ mol of methyl-imino-methyl-sulfurous acid (sodium salt) to which an excess of the sodium salt of acetic acid has been added, there is slowly introduced at a temperature of about 0° to 10° C. a diazo solution prepared in the usual manner from 4-chloro-2-toluidine ($NH_2=1$). The reaction is soon complete.

After filtration, the condensation product is precipitated by the addition of potassium chloride. In its free state it has the following formula

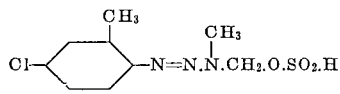

The sodium salt of the methyl-imino-methyl-sulfurous acid can be obtained by reacting upon methyl-amine in aqueous solution with an equivalent quantity of formaldehyde sodium bisulfite and precipitating the sodium salt with alcohol.

Instead of formaldehyde there may be used any other aldehyde.

*Example 2*

In an analogous manner as described in Example 1, there is obtained from the diazo compound prepared from 5-nitro-2-toluidine, coupled in the presence of sodium bicarbonate as acid binding agent, in a well crystallized form the compound of the formula

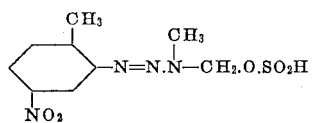

*Example 3*

The condensation of the diazo compound from 5-chloro-2-toluidine and amino-methyl-sulfurous acid (Berichte der deutschen Chemischen Gesellschaft Vol. 38, p. 1073) proceeds in the same manner as described in Example 1, in the presence of soda. The condensation product is obtainable in the form of its potassium salt in a crystalline form.

*Example 4*

If instead of amino-methyl-sulfurous acid of Example 3, there is used the imino-di-methyl-sulfurous acid of the formula: $HSO_2.O.CH_2.NH.CH_2.O.SO_2H$ (compare German Patent 216,072), the condensation proceeds in the same manner as described in Example 3.

We claim:

1. The process which comprises reacting upon a compound of the general formula:

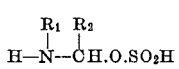

wherein $R_1$ stands for hydrogen, alkyl, a hydrogenated benzene nucleus or the residue of an aldehyde-sulfurous-acid, and $R_2$ stands for hydrogen, an alkyl—, or a phenyl-group with about an equivalent quantity of a diazo-compound of an aromatic amine in aqueous solution in the presence of an acid binding agent.

2. The process which comprises reacting upon a compound of the general formula:

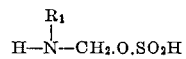

wherein $R_1$ stands for hydrogen, alkyl, a hydrogenated benzene nucleus or the residue of an aldehyde-sulfurous-acid, with about an equivalent quantity of a diazo compound of an aromatic amine in aqueous solution in the presence of an acid binding agent.

3. The process which comprises reacting upon a compound of the general formula:

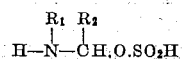

wherein $R_1$ stands for hydrogen, alkyl, a hydrogenated benzene nucleus or the residue of an aldehyde-sulfurous-acid, and $R_2$ stands for hydrogen, an alkyl—, or a phenyl-group with about an equivalent quantity of a diazo-compound of an aromatic amine in aqueous solution in the presence of an acid binding agent at a temperature of at most about 20° C.

4. The process which comprises reacting upon a compound of the general formula:

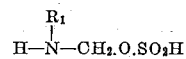

wherein $R_1$ stands for hydrogen, alkyl, a hydrogenated benzene nucleus or the residue of an aldehyde-sulfurous-acid, with about an equivalent quantity of a diazo compound of an aromatic amine in aqueous solution in the presence of an acid binding agent at a temperature of at most about 20° C.

5. The process which comprises reacting upon a compound of the general formula:

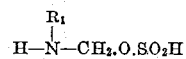

wherein $R_1$ stands for an alkyl group with about an equivalent quantity of a diazo compound of an aromatic amine in aqueous solution in the presence of an acid binding agent at a temperature of at most about 20° C.

6. The process which comprises reacting upon a methyl-imino-methyl-sulfurous acid with about an equivalent quantity of a diazo compound of the benzene series, wherein the benzene nucleus may be substituted by halogen, the alkyl, nitro, sulfonic acid or carboxylic acid groups in aqueous solution in the presence of an acid binding agent at a temperature of at most about 20° C.

7. The process which comprises reacting upon 1¼ mols of methyl-imino-methyl-sulfurous acid with 1 mol of the diazo-compound from 4-chloro-2-toluidine, in aqueous solution, in the presence of the sodium salt of acetic acid at a temperature from 0° C. to 10° C.

8. As new products compounds of the probable general formula:

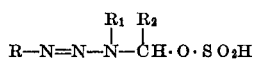

wherein R stands for an aromatic nucleus which may be substituted by halogen, the alkyl, nitro, sulfonic acid or carboxylic acid groups, $R_1$ stands for hydrogen alkyl, a hydrogenated benzene nucleus or the residue of an aldehyde-sulfurous acid, and $R_2$ stands for hydrogen, an alkyl—, or a phenyl-group, being in their dry form stable, generally yellowish colored substances, soluble in water, being split up in aqueous solution into the two starting components by the addition of a mineral acid, and being valuable substances in the manufacture of dyestuffs.

9. As new products compounds of the probable general formula:

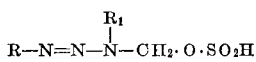

wherein R stands for a benzene nucleus which may be substituted by halogen, the alkyl, nitro, sulfonic acid or carboxylic acid groups, and $R_1$ stands for an alkyl group, being in their dry form stable, generally yellowish colored substances, soluble in water, being split up in aqueous solution into the two starting components by the addition of a mineral acid, and being valuable substances in the manufacture of dyestuffs.

10. As a new product the compound of the probable general formula:

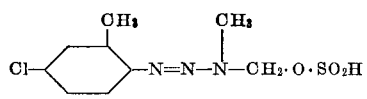

being a yellowish colored powder, soluble in water and being split up by the addition of a mineral acid to its aqueous solution into the diazo compound of 4-chloro-2-toluidine and methyl-imino-methyl-sulfurous acid.

In testimony whereof we have hereunto set our hands.

WILHELM NEELMEIER.
EUGEN GLIETENBERG.